United States Patent [19]

Dillon

[11] 4,029,200
[45] June 14, 1977

[54] TROUGHED ROLLERS FOR BULK MATERIAL HANDLING

[75] Inventor: Jan J. Dillon, Irving, Tex.
[73] Assignee: F.E.I., Inc., Dallas, Tex.
[22] Filed: Nov. 3, 1975
[21] Appl. No.: 628,213
[52] U.S. Cl. .............................. 198/830; 29/116 R; 193/37
[51] Int. Cl.² ........................................ B65G 15/08
[58] Field of Search ............... 198/192 R, 825, 830; 193/37; 29/132, 116 R; 308/72, 20

[56] References Cited
UNITED STATES PATENTS

| | | | |
|---|---|---|---|
| 1,838,190 | 12/1931 | Robbins | 198/192 R |
| 2,592,915 | 4/1952 | Lee | 198/192 R |
| 3,166,058 | 1/1965 | Zink | 308/72 X |
| 3,931,878 | 1/1976 | Payne | 193/37 |

*Primary Examiner*—Evon C. Blunk
*Assistant Examiner*—Douglas D. Watts
*Attorney, Agent, or Firm*—Richards, Harris & Medlock

[57] ABSTRACT

Two concentric tubes made from a lightweight plastic are locked together by two plastic cylindrical end pieces having an aperture formed in the center thereof. The outer plastic tube rotatably supports an advancing conveyor belt carrying a bulk type material, while the inner plastic tube receives the turning torque stress. Self-lubricating plastic bearing members having blind sockets formed in the center thereof are dimensioned to be inserted in the ends of the roller. Stub shafts having generally spherical stainless steel bearing portions formed on the ends thereof are closely received within the blind sockets to rotatably suspend the roller assembly therebetween. Under such high speed, heavy-duty operations the heat built up in the stainless steel bearing is dissipated through an aluminum stub shaft to the frame assembly for the bulk material handling system. In one embodiment, the cylindrical bearing members of a central idler and an adjoining inclined idler are rotatably supported by a single curved stub shaft having generally spherical bearing portions formed on both ends for being received within the blind sockets of these bearing members.

7 Claims, 8 Drawing Figures

TROUGHED ROLLERS FOR BULK MATERIAL HANDLING

FIELD OF THE INVENTION

This invention relates to troughed idlers for use in a bulk material handling system, and, more particularly, it relates to a double-walled plastic roller having blind sockets formed within self-lubricating plastic bearing members for receiving stainless steel bearings.

CROSS-REFERENCES

This is an improvement over the application Ser. No. 457,859, filed Apr. 4, 1974, now U.S. Pat. No. 3,931,878. This application is assigned to the same assignee as the above-referenced application.

DESCRIPTION OF THE PRIOR ART

Bulk material conveyors commonly carry loose material upon a conveyor belt looped around a set of drive pulleys and rotatably supported by rollers placed at spaced apart locations along the conveyor belt's path. The bulk material, such as sand, gravel, grain, sugar, fertilizer, cement, etc., being in a nonpackaged loose state, would spill over the edge of a flat belt, so the outer roller or rollers on each side of the belt are inclined to form a depression or trough in the center of the belt to carry loose material in the center of the troughed belt. The bulk material deposited at one end of the continuous conveyor belt is carried in this fashion to an unloading area where the belt travels around a pulley to discharge material at this point. The empty belt is returned underneath the conveyor frame assembly and is supported by a number of flat return idlers.

Heretofore, the troughed rollers for supporting the conveyor belt have been made of steel or other metal to provide the necessary rigidity and strength to support a loaded conveyor belt, while withstanding the turning torque stress produced by the advancing conveyor belt. Ball bearings have been used for rotatably supporting the rollers, but such bearings often fail because of exposure to moist or abrasive material getting inside the bearing, or lack of proper lubrication and maintenance. A roller that fails from any of these reasons locks up and cannot turn so that the belt wears through the steel wall of the roller, thereby cutting the belt with the sharp edges of the roller.

Moreover, some types of bulk material will adhere to the metal rollers, causing the belt to travel unevenly and track to one side. This can cause the belt to wear out from rubbing against the framework or dump material over the side since the belt is no longer properly troughed. Troughed rollers of the prior art require frequent lubrication and often fail because the bulk handling system are generally used in environments such as in overhead framework, in tunnels, in mines, or underground that make lubrication difficult or impossible. In addition, steel rollers now in use require excessive horsepower to overcome the initial start-up inertia present in such a bulk handling system, as well as excessive energy losses from keeping the steel rollers turning.

The troughed roller of the present invention overcomes many of the disadvantages associated with the prior art devices. Lubrication problems are eliminated since the troughed roller of the present invention does not require any lubricants. The lightweight plastic material utilized in constructing the present troughed roller results in a roller that is only one third the weight of a conventional metal roller. This reduction in the weight of the rollers reduces the horsepower requirements to operate the bulk handling system, enabling it to conserve energy.

SUMMARY OF THE INVENTION

The present invention provides a highly durable lightweight plastic troughed roller, offering reduced maintenance and operating costs when used in a bulk material handling system.

In accordance with the present invention, an outer plastic elongated tube for supporting an advancing conveyor belt has an inner plastic elongated tube concentrically disposed within the outer tube. A pair of cylindrical plastic end pieces, having an aperture extending through the center of each, are dimensioned so that the end of the inner tube is closely received within the aperture, while the exterior cylindrical surface of the end piece is received within the end of the outer plastic tube. The outer and inner plastic tubes are rigidly interconnected to the end pieces. Self-lubricating plastic bearing members are dimensioned to be closely received within the apertured plastic end pieces. Annular flanges formed on the outer end of the bearing members regulate the bearing members seating depth within the end pieces. A blind socket is formed in center of the outer end of the bearing members to receive a generally spherical bearing.

In accordance with another aspect of the invention, an improved hollow cylindrical roller for use in a troughed roller assembly has self-lubricating plastic bearing members rigidly mounted in the ends of the rollers, each bearing member having a blind right circular cylindrical socket formed in its center. A plurality of opposed metal stub shafts having generally spherical bearing portions are located at spaced apart locations for being closely received within the blind sockets to rotatably suspend the roller carried thereby between.

In accordance with yet another aspect of the invention, an improved hollow cylindrical roller for the in a troughed roller assembly includes low friction self-lubricating plastic bearing members rigidly mounted in the ends of the rollers with a blind right circular cylindrical socket formed in the end of the bearing members. Two metal stub shafts located at each end of the roller assembly have generally spherical bearing portions on one end for being received with the blind socket in the outer end of the two inclined rollers. The interior roller supports include two curved metal stub shafts with generally spherical bearing portions formed on each end thereof, one bearing portion of each being received within the blind sockets of a central roller to rotatably suspend it, while the bearing portion on the other end of the curved metal stub shaft is closely received within the blind socket of the inner bearing member of the inclined rollers to thereby form a troughed roller assembly.

BRIEF DESCRIPTION OF THE DRAWINGS

For a more complete understanding of the present invention and further objects and advantages thereof, reference is now made to the following description taken in conjunction with the following drawings.

DESCRIPTION OF THE PREFERRED EMBODIMENT

Figure 1:
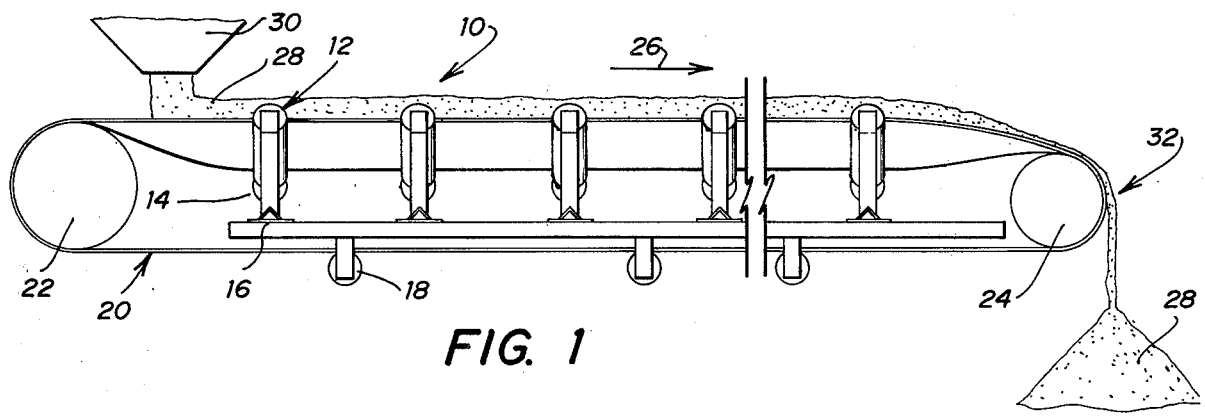
FIG. 1 illustrates an elevated side view of a bulk material handling system utilizing troughed rollers.

FIG. 1 illustrates a side view of a typical bulk material handling system, generally referred to by the numeral 10. The system 10 employs a plurality of troughed rollers 12 of the present invention. As shown in FIG. 1, a troughed roller support assembly 14 utilizes one troughed roller 12 in the middle surrounded by two inwardly inclined troughed rollers 12 to form a trough or depression therebetween. The trough roller support assembly 14 is in turn rigidly mounted upon a conveyor frame 16, which includes a plurality of flat return idlers 18.

A continuous conveyor belt 20 is shown looped around a pair of drive pulleys 22 and 24 to advance the belt over the troughed roller assemblies 14 in the direction shown by arrow 26. The conveyor belt 20 is flexible so that it conforms to the troughed shaped roller assemblies 14. The drive pulleys 22 and 24 are in turn driven by a power source (now shown) to control the operation of the bulk material handling system 10.

In a typical operation, a bulk material 28 is discharged from a hopper 30 at one end of the troughed conveyor 20. The bulk material 28 is thus carried by conveyor belt 20 as long as the material 28 is retained within this depression. The bulk material 28 is carried in the direction shown by arrow 26 until it is discharged at a point 32 as the conveyor belt 20 returns to a flat shape as it passes over the pulley 24. The flat conveyor belt 20 is now carried upon a series of flat return idlers 18 until it loops around drive pulley 22 to the point where it receives additional material from discharge hopper 30. (The flat return idlers 18 may be constructed similar to the troughed roller 12, described below, to eliminate lubrication for the idlers 18.)

Figure 2:
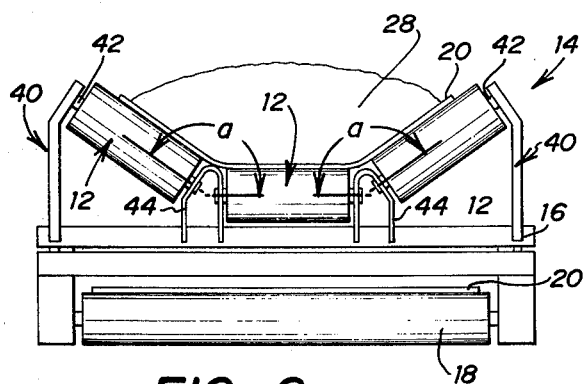
FIG. 2 illustrates a front view taken along the lines 2—2 of FIG. 1.

FIG. 2 illustrates a front view of the troughed roller assembly 14 taken along the lines 2—2 of FIG. 1. The troughed roller assembly 14 includes a pair of exterior roller support arms 40 extending upwards from the conveyor frame 16. The ends of the exterior roller support pieces 40 are bent inwardly to achieve the desired angle of inclination for the troughed rollers 12. A stub shaft bearing assembly, generally referred to by the numeral 42, is secured in the inclined ends of each of the exterior roller supports 40 for being received by an inclined roller 12.

A pair of interior roller supports 44 are rigidly mounted to the conveyor frame 14 to support stub shaft bearing assemblies 42 for the central troughed roller 12 located therebetween and the stub shaft bearing assemblies 42 for the interior end of each of the inclined troughed rollers 12. Each of the interior roller supports 44 orients the opposed stub shaft bearing assemblies 42 so that the central troughed roller 12 has its axis of rotation parallel to the plane containing the conveyor frame 16. In addition, each of the interior roller support assemblies 44 supports a stub shaft bearing assembly 42 for the interior ends of the inclined troughed rollers 12 at the desired angle of inclination $a$. The troughed rollers 12 in combination with the stub shaft bearing assemblies 42 are shown in greater detail in FIGS. 4 and 5 below.

Figure 3:
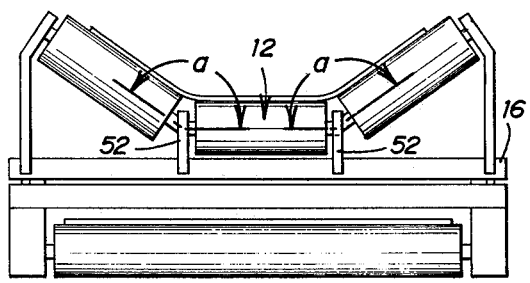
FIG. 3 illustrates an alternate embodiment of the troughed roller assembly of the present invention shown in FIG. 2.

FIG. 3 illustrates a curved stub shaft bearing assembly 50 to be supported by a pair of interior troughed roller supports 52. The stub shaft bearing assembly 50 is curved to incline the rollers 12 at the desired angle of inclination $a$. Each stub shaft bearing assembly 50 rotatably supports the central troughed roller 12 and the inner end of each of the inclined troughed rollers 12. (The curved bearing assembly 50 is described in greater detail below in the description of FIGS. 8 and 9.)

Figure 4:
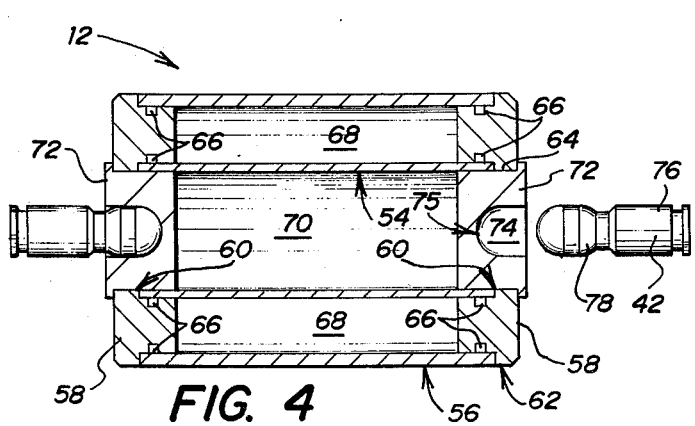
FIG. 4 illustrates a cut away side view of a troughed roller of the present invention. p

FIG. 4 illustrates a cut away side view of the troughed roller 12 shown in FIGS. 1–3. An inner elongated hollow plastic tube 54 is concentrically disposed within an outer hollow elongated plastic tube 56. Concentric tubes 54 and 56 may be made from polyvinyl chloride or a similar light-weight plastic. A plastic cylindrical end piece 58 having an aperture 60 formed in the center thereof holds the concentric tubes 54 and 56 together to form the basic configuration for the troughed roller 12. The outside diameter of the cylindrical end piece 58 is dimensioned to be closely received within the outer tube 56, while the inner diameter of end piece 58 created by the aperture 60 is dimensioned to closely receive the inner tube 54. An annular flange 62 is formed around the outer perimeter of the cylindrical end piece 58 to regulate the seating depth of the end piece 58 within the outer tube 56. Similarly, an interior annular flange 64 regulates the seating depth of the inner tube 54 within the end piece 58.

Notches 66 are cut around the interior and exterior cylindrical surfaces of the end pieces 58 to provide a means for rigidly connecting the concentric inner and outer tubes 54 and 56 to the end pieces 58. The interior and exterior cylindrical surfaces around the notches 66 are coated with an appropriate solvent or cement before assembly. The adjoining surfaces of the inner and outer tubes 54 and 56 dissolve or swell into these notches 66 to rigidly interconnect the rollers 54 and 56 to end pieces 58 when the solvent or cement hardens the plastic in these notches 66. The troughed roller assembly consisting of the inner tube 54, outer tube 56 and two end pieces 58 are now fused into one solid piece.

The plastic construction of the troughed roller 12 gives it a greater resiliency than the conventional steel troughed roller of the prior art. However, at particular points along the advancing conveyor belt, like the load point, additional resiliency or give may be desired in the roller to prevent cuts and abrasions in the rubber belt 20 from bulk material having sharp and irregular edges. To achieve greater resiliency, a high impact styrene, such as "Styrofoam", may be foamed in place in the interstices 68 between the concentric hollow tubes 54 and 56. Additional resiliency may be obtained by foaming the high impact styrene in the hollow space 70 within the inner plastic tube 54. It is understood of course that such highly resilient troughed rollers 12 may be used throughout the bulk material handling system 10 to reduce the wear on the belt from heavy bulk material that has numerous sharp and protruding edges.

A self-lubricating plastic cylindrical bearing member 72 is dimensioned to be closely received within the aperture 60 of each of the end pieces 58. The outside diameter of the bearing member 72 is slightly greater than the interior diameter of the overlapping edge of the interior tube 54 to provide an interference fit when the bearing member 72 is pressed into place. The cylindrical bearing members 72 may be made from a plastic material known commercially as "LUBRA-TUF" (a specially processed UHMW polyethylene) that has a low coefficient of friction. The cylindrical bearing members 72 have right circular cylindrical blind sockets 74 formed in the center of the outer ends of the bearing members 72. The blind sockets 74 of the bearing member 72 shown in FIG. 4 extends to a concave inner end surface 75. With the cylindrical bearing members 72 pressed into place, the plastic trough roller 12 is completely sealed, preventing any possible entry of foreign or gaseous matter into the interior of the hollow roller 12. Preventing the entry of foreign matter into the hollow troughed roller 12 would be of great advantage in many environments where bulk material handling systems are used. For example, in the fertilizer industry, fumes from the fertilizer pass through the ball bearings supporting the hollow steel rollers of a prior art trough roller, thereby filling the interior of the roller with an explosive gas. The failure of a bearing can cause either heat or generate a spark to explode the roller. Such problems are eliminated by the trough roller 12 of the present invention.

FIG. 4 also illustrates the stub shaft bearing assembly 42 received within the blind socket 74 of the troughed roller 12. The assembly 42 includes a stub shaft 76 with a generally spherical bearing portion 78 formed on the end thereof. The end of the stub shaft 76 is rigidly mounted to an exterior support assembly 40 or an interior roller support 44, as described above in FIG. 2. The spherical bearing portion 78 is dimensioned to be closely received within the blind socket 74 of the bearing member 72. In the configuration shown in FIG. 4, the bearing portion 78 extends inwardly and conforms to the concave inner end surface 75 of the blind sockets 74. This particular configuration evenly distributes the load forces produced by the belt 20 carrying a bulk material 28.

Figure 5:
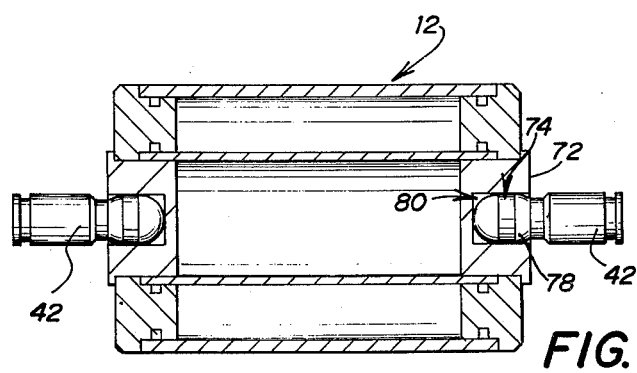
FIG. 5 illustrates a cut away side view of a troughed roller of the present invention with an alternately shaped blind socket.

FIG. 5 illustrates an alternate embodiment of the stub shaft bearing assembly 42 in the bearing member 72. In this configuration, the blind socket 74 extends to a flat planar inner end surface 80, and the spherical bearing 78 received within the blind sockets 74 extends inwardly to tangentially engage inner end surface 80. This point contact configuration of the bearing 78 in the blind socket 74 is more suitable for use in a bulk material handling system where the belt 20 is carrying a lighter weight bulk material, and the system operates at higher speeds.

Figure 6:
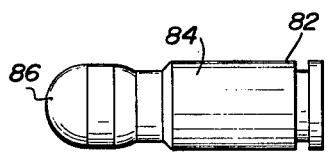
FIG. 6 illustrates a side view of the bearing portion and stub shaft employed in the present invention.

FIG. 6 illustrates an alternate stub shaft bearing assembly 82 for use in conjunction with the troughed roller 12 described above. The stub shaft bearing assembly 82 has a cylindrical stub shaft 84 made from a metal, such as aluminum, having a relatively high coefficient of thermal conductivity. A generally spherical bearing portion 86 is formed on the end of the stub shaft 84, since it is desirable to have a metal with a high abrasion resistance to be received within the cylindrical bearing member 72. Considerable heat builds up in the blind socket 74 of the bearing member 72 when the troughed rollers 12 are operated under heavy loads for an extended period of time. The build up of heat within the blind socket 74 decreases the life of the bearing member 72, while increasing the friction between the bearing 78 and bearing member 72. The stub shaft bearing assembly 82 conducts heat away from the stainless steel bearing 86 through the aluminum stub shaft 84 to the troughed roller supports 40 and 44 (see FIG. 2).

Figure 7:
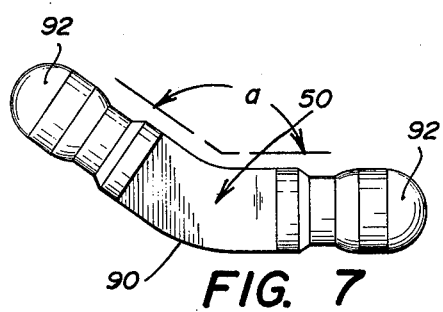
FIG. 7 illustrates a side view of an interior stub shaft having two bearing portions formed on an end thereof.
Figure 8:
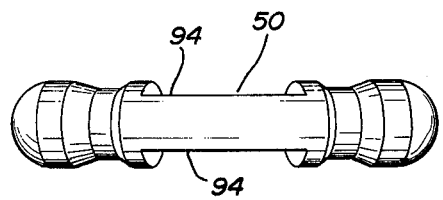
FIG. 8 illustrates a bottom view of the interior stub shaft shown in FIG. 7.

FIGS. 7 and 8 illustrate an alternate embodiment of a stub shaft and bearing combination to rotatably support the troughed rollers. The one piece curved stub shaft bearing member 50 has a central curved stub shaft section 90 with two spherical bearing portions 92 formed on each end thereof. The stub shaft 90 is curved at an angle $a$ which is the desired angle of inclination of the inclined trough roller 12 (not shown). The stub shaft 90 has notches 94 formed on either side thereof so shaft 90 may be adjustably received within an interior roller support 52. The notches 94 enable the stub shaft bearing member 50 to be correctly positioned within the support member 52. The stub shaft bearing member 50 reduces the number of parts in a bulk material handling system when it is used to rotatably suspend a central troughed roller 12 therebetween and the inner end of each of the inclined rollers 12. The stub shaft bearing member 50 also may have its bearing members 92 made from stainless steel while the angle shaft portion 90 is made from aluminum, having a higher coefficient of thermal conductivity, to conduct heat away from the bearing members to prolong the life of the troughed rollers.

It is to be understood, of course, that the bulk material handling system 10 shown in FIGS 1-3, described hereinabove, is not limited to that configuration employing three troughed rollers 12. The troughed roller support assembly 14 may support any number of troughed rollers 12 to form the desired trough shape to support conveyor belt 20 thereon. For example, the troughed roller support assembly 14 may include two inclined troughed rollers 12 that are proximally located to one another to form a suitable trough for supporting a conveyor belt 20 at the desired angle of inclination $a$.

Such a material handling system 10 employing two troughed rollers 12 could employ a centrally located roller support, similar to interior roller support 44 shown in FIG. 2. Such a centrally located roller support assembly could angularly support two stub shaft bearing assemblies, similar to bearing assemblies 42 shown in FIG. 2, for rotatably supporting the interior opposing ends of the inclined troughed rollers 12. The outer ends of the troughed rollers 12 might be supported by a pair of stub shaft bearing assemblies located on exterior roller support arms, similar to roler support arms 40.

In an alternate embodiment of a material handling system 10 employing two inclined troughed rollers 12, the central roller support assembly could be rotatably supported by a curved bearing assembly, such as bearing assembly 50 shown in FIG. 7, and supported on an interior troughed roller support similar to roller support 52 shown in FIG. 3. The desired angle of inclination $a$ of the troughed rollers 12 would be determined by the curvature of the bearing support assembly. The outer ends of the troughed rollers 12 could be supported in the manner shown in FIG. 2 and described hereinabove.

Although preferred embodiments of the invention have been illustrated in the accompanying drawings and described in the foregoing detailed description, it will be understood that the invention is not limited to the embodiments disclosed, it is capable of numerous rearrangements, modifications, and substitution of parts and elements without departing from the spirit of the invention.

What is claimed is:

1. A heavy-duty self-lubricating roller for use in a belt conveyor system employing troughed rollers comprising:
    an outer elongated hollow cylindrical tube for supporting an advancing conveyor belt;
    an inner elongated hollow cylindrical tube dimensioned to be concentrically disposed within said outer tube;
    a pair of cylindrical plastic end pieces each having a right circular cylindrical aperture extending through the center thereof;
    said plastic end pieces being dimensioned so that each end of said inner tube is closely received within the aperture of one of said end pieces and the exterior cylindrical surface of each of said end pieces is closely received within each end of said outer tube;
    means for rigidly interconnecting said outer and inner plastic tubes to said cylindrical end pieces;
    self-lubricating plastic cylindrical bearing members dimensioned to be closely received within said aperture of each of said cylindrical end pieces;
    said cylindrical bearing members having annular flanges formed on the outer end thereof to regulate the seating depth of said cylindrical bearing members within said cylindrical end pieces; and
    a blind socket formed in the center of the outer end of said cylindrical bearing members, said blind socket being dimensioned to closely receive a generally spherical bearing.

2. The heavy-duty self-lubricating roller of claim 1 wherein said means for rigidly interconnecting said outer and inner tubes to said cylindrical end pieces includes a plurality of notches formed around the exterior cylindrical surfaces of said plastic end pieces and within the interior cylindrical surface formed by said right circular apertures in said plastic end pieces, whereby solvent applied to the surfaces of said outer and inner tubes adjoining said notches causes the adjoining surfaces of said outer and inner tubes to swell into said notches locking said outer tube and said inner tube to said end pieces.

3. The heavy-duty self-lubricating roller of claim 1 wherein said blind socket is a right circular cylindrical blind socket extending to a concave inner end surface.

4. The heavy-duty self-lubricating roller of claim 1 wherein said blind socket is a right circular cylindrical blind socket extending to a planar inner end surface.

5. The heavy-duty self-lubricating roller of claim 1 wherein said cylindrical end pieces each have an annular flange formed around one end of the exterior cylindrical surface for regulating the seating depth of said plastic end piece in said outer tube and said cylindrical end pieces having an annular flange formed within the right circular cylindrical aperture of each of said end pieces for regulating the seating depth of said inner tube within said end pieces.

6. The heavy-duty self-lubricating plastic roller of claim 1 wherein said cylindrical bearing member has an outside diameter dimensioned to be slightly greater than the inside diameter of said inner tube to provide a self-sealing interference fit preventing the entry of any foreign gaseous or liquid matter into the interior of the plastic roller.

7. The heavy-duty self-lubricating plastic roller of claim 1 and further comprising an energy absorbing material disposed in the interstital space between said outer tube and said inner tube to thereby add resiliency to the plastic roller to reduce wear on the belt caused by cuts and abrasion from carrying irregularly shaped or heavy bulk material.

* * * * *

UNITED STATES PATENT AND TRADEMARK OFFICE
CERTIFICATE OF CORRECTION

PATENT NO. : 4,029,200

DATED : June 14, 1977

INVENTOR(S) : Jan J. Dillon

It is certified that error appears in the above—identified patent and that said Letters Patent are hereby corrected as shown below:

Col. 6, line 56, change "roler" to --roller--.
Col. 8, line 3, change "surfaces" to --surface--;
  line 33, delete "plastic" per amendment filed
  August 23, 1976.

Signed and Sealed this

Seventh Day of March 1978

[SEAL]

Attest:

RUTH C. MASON
Attesting Officer

LUTRELLE F. PARKER
Acting Commissioner of Patents and Trademarks